(12) United States Patent
Gloger, Jr.

(10) Patent No.: US 7,156,475 B2
(45) Date of Patent: Jan. 2, 2007

(54) MOBILE STORAGE SYSTEM FOR PORTABLE ELECTRONIC ELECTION DEVICES

(76) Inventor: Dan R. Gloger, Jr., 2255 Vermont St., Melbourne, FL (US) 32904

( * ) Notice: Subject to any disclaimer, the term of this patent is extended or adjusted under 35 U.S.C. 154(b) by 290 days.

(21) Appl. No.: 10/788,352

(22) Filed: Mar. 1, 2004

(65) Prior Publication Data

US 2004/0201190 A1 Oct. 14, 2004

Related U.S. Application Data

(60) Provisional application No. 60/461,198, filed on Apr. 9, 2003.

(51) Int. Cl.
*E05B 65/00* (2006.01)
(52) U.S. Cl. .................. 312/216; 312/249.11; 312/287
(58) Field of Classification Search ................ 312/216, 312/223.6, 107, 108, 902, 249.8, 249.11, 312/249.12, 249.13, 9.53, 111, 117, 198, 312/234.4, 279, 196, 287; 211/26; 361/683
See application file for complete search history.

(56) References Cited

U.S. PATENT DOCUMENTS

| 435,254 | A | * | 8/1890 | Straughan .................... 312/234 |
|---|---|---|---|---|
| 1,075,652 | A | * | 10/1913 | Kleber ........................ 312/304 |
| 1,430,465 | A | * | 9/1922 | Niemuth .................. 297/174 R |
| 2,115,239 | A | * | 4/1938 | Strain ........................ 312/196 |
| 2,646,329 | A | * | 7/1953 | Wilhide ...................... 312/310 |
| 2,967,080 | A | * | 1/1961 | Nelson ....................... 312/216 |
| 2,987,358 | A | * | 6/1961 | Roberts ...................... 312/216 |
| 3,229,368 | A | * | 1/1966 | Tocchini ...................... 433/27 |
| 3,752,549 | A | * | 8/1973 | Binks et al. ................. 312/236 |
| 3,772,572 | A | * | 11/1973 | Marquette ................... 211/162 |
| 3,897,855 | A | * | 8/1975 | Patterson .................... 312/209 |
| 4,489,996 | A | * | 12/1984 | Norton et al. ............... 312/279 |
| 4,614,384 | A | * | 9/1986 | Takano et al. .............. 312/281 |
| 4,807,760 | A | * | 2/1989 | Sussman ..................... 206/581 |
| 5,096,273 | A | * | 3/1992 | Alexander et al. .......... 312/198 |
| 5,103,659 | A | * | 4/1992 | Benefield, Sr. ................ 70/94 |
| 5,528,453 | A | | 6/1996 | Berman et al. |
| 5,536,084 | A | * | 7/1996 | Curtis et al. ................ 700/240 |
| 5,551,773 | A | | 9/1996 | Cottrell |
| 5,639,150 | A | | 6/1997 | Anderson et al. |
| 5,655,824 | A | * | 8/1997 | DeCosse ..................... 312/209 |
| 5,673,985 | A | | 10/1997 | Mitchell |
| 5,988,473 | A | * | 11/1999 | Hagan et al. ................ 224/404 |
| 6,082,845 | A | | 7/2000 | Eizadkhah et al. |
| 6,168,249 | B1 | | 1/2001 | Chien |
| 6,238,029 | B1 | | 5/2001 | Marzec et al. |
| 6,352,290 | B1 | * | 3/2002 | Scottino ................. 292/259 R |

(Continued)

*Primary Examiner*—Janet M. Wilkens
(74) *Attorney, Agent, or Firm*—Richard C. Litman

(57) ABSTRACT

The mobile storage system for storing and transporting portable electronic election devices includes a wheeled base unit and a cabinet mounted thereon, the cabinet having at least one row of front accessed slotted compartments, each compartment dimensioned to receive an electronic election device. A removable and lockable retaining bar, mounted across the front of each row of slotted compartments, is operative to secure the election devices within their respective compartments. A work surface is slidably received within the base unit and additional storage compartments are provided within the base unit. A horizontal member mounted in the rear of the storage system is operative to prevent removal of the election devices from the rear and to support a plurality of battery chargers associated with each electronic election device. Power receptacles mounted on the storage system receive the AC power plugs associated with each charger.

9 Claims, 5 Drawing Sheets

U.S. PATENT DOCUMENTS

| | | |
|---|---|---|
| 6,394,284 B1 * | 5/2002 | Bodensteiner et al. ........ 211/26 |
| 6,443,542 B1 | 9/2002 | Lindquist et al. |
| 6,471,308 B1 | 10/2002 | Konshak et al. |
| 6,499,609 B1 * | 12/2002 | Patriche et al. ............. 211/175 |
| 6,641,236 B1 * | 11/2003 | Grudzien .................... 312/216 |
| 6,976,744 B1 * | 12/2005 | Hay et al. ................... 312/281 |
| 2002/0140325 A1 | 10/2002 | Webster et al. |
| 2002/0153814 A1 | 10/2002 | Robideau |
| 2002/0185941 A1 | 12/2002 | Perraro et al. |
| 2003/0019823 A1 | 1/2003 | Corbett, Jr. et al. |
| 2004/0080105 A1 * | 4/2004 | Stevenson ................... 271/278 |
| 2004/0232092 A1 * | 11/2004 | Cash ............................ 211/4 |
| 2005/0218616 A1 * | 10/2005 | Copeland et al. ........ 280/47.35 |

\* cited by examiner

MOBILE STORAGE SYSTEM FOR PORTABLE ELECTRONIC ELECTION DEVICES

CROSS-REFERENCE TO RELATED APPLICATION

This application claims the benefit of U.S. Provisional Patent Application Ser. No. 60/461,198, filed Apr. 9, 2003.

BACKGROUND OF THE INVENTION

1. Field of the Invention

The present invention relates to mobile storage systems, and more specifically, to storage racks for portable electronic devices.

2. Description of Related Art

The use of portable electronic recording devices for elections has seen a dramatic increase since the 2000 Presidential election, at which time antiquated paper and punch ballots proved to be unreliable and prone to error. The electronic election devices currently available, portable and wireless, are approximately the size of a laptop computer, and are increasingly being deployed in election precincts across the nation to facilitate the voting process and to enhance the reliability of the election process.

An election precinct may require anywhere from a few to a few dozen electronic election devices, depending upon the number of registered voters. As with the larger and more bulky mechanical voting machines, these portable election devices must be stored securely at a central storage facility. In addition, the small size and high cost of these electronic devices raises physical security concerns to a level higher than that required with the larger mechanical voting machines or punch systems. Furthermore, these electronic devices are battery powered and require charging prior to being deployed, thus making it advantageous to store and charge a number of devices simultaneously.

Mobile storage systems for electronic equipment are not new in the electronics field. However, none are designed for the secure storage and transportation of more than two-dozen electronic election devices. U.S. Pat. No. 6,471,308, issued to Konshak et al. in 2002, discloses a frameless stackable cabinet system for rack mounted electronic equipment. Furthermore, U.S. Pat. No. 6,443,542, issued to Lindquist et al. in 2002, shows a cabinet system with wheels and a method of assembling the same.

U.S. Pat. No. 5,551,773, issued to Cottrell in 1996, discloses a mobile workbench including a top, a container under the top for storing parts and tools, and a hinged door providing access to the container. The device of the '773 patent has four wheels with brakes. Two wheels on one end of the device swivel for ease and convenience of movement. Furthermore, U.S. Patent Publication No. 2002/0185,941, published in 2002, discloses a moving cart assembly with a plurality of interlocking, vertically stackable, storage modules.

In addition to the systems described above, the following U.S. Patent Publications describe electronic enclosures: U.S. Patent Publication No. 2002/0140325, published October 2002; U.S. Patent Publication No. 2002/0153814, published October 2002; U.S. Patent Publication No. 2003/0019823, published January, 2003; U.S. Pat. No. 5,048,902, issued to Daly in 1991; U.S. Pat. No. 5,528,453, issued to Berman et al.; U.S. Pat. No. 5,639,150, issued to Anderson et al. in 1997; U.S. Pat. No. 5,673,985, issued to Mitchell in 1997; U.S. Pat. No. 6,082,845, issued to Eizadkhah et al. in 2000; U.S. Pat. No. 6,168,249, issued to Chien in 2001; and U.S. Pat. No. 6,238,029, issued to Marzec et al. in 2001.

None of the above inventions and patents, taken either singly or in combination, is seen to describe the instant invention as claimed.

SUMMARY OF THE INVENTION

The present invention is a mobile storage system for storing and transporting a plurality of portable electronic election devices. The storage system has a wheeled base unit and an upper cabinet mounted thereon. The cabinet has a plurality of front accessed slotted compartments arranged in rows, each slotted compartment being adapted to receive a portable electronic election device. The base unit has two storage compartments and a sliding work surface above the storage compartments which extends out from the base unit when required and is received flush with the front surface of the base unit when the work surface is not required. A retaining bar removably mounted across the front of the slotted compartments secures the election devices within their respective compartments. A hollow horizontal member mounted in the rear of the storage system across the slotted compartments prevents removal of the election devices from the rear and supports a plurality of battery chargers associated with each portable electronic election device, the AC plugs of which are received within power receptacles mounted on the storage system.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
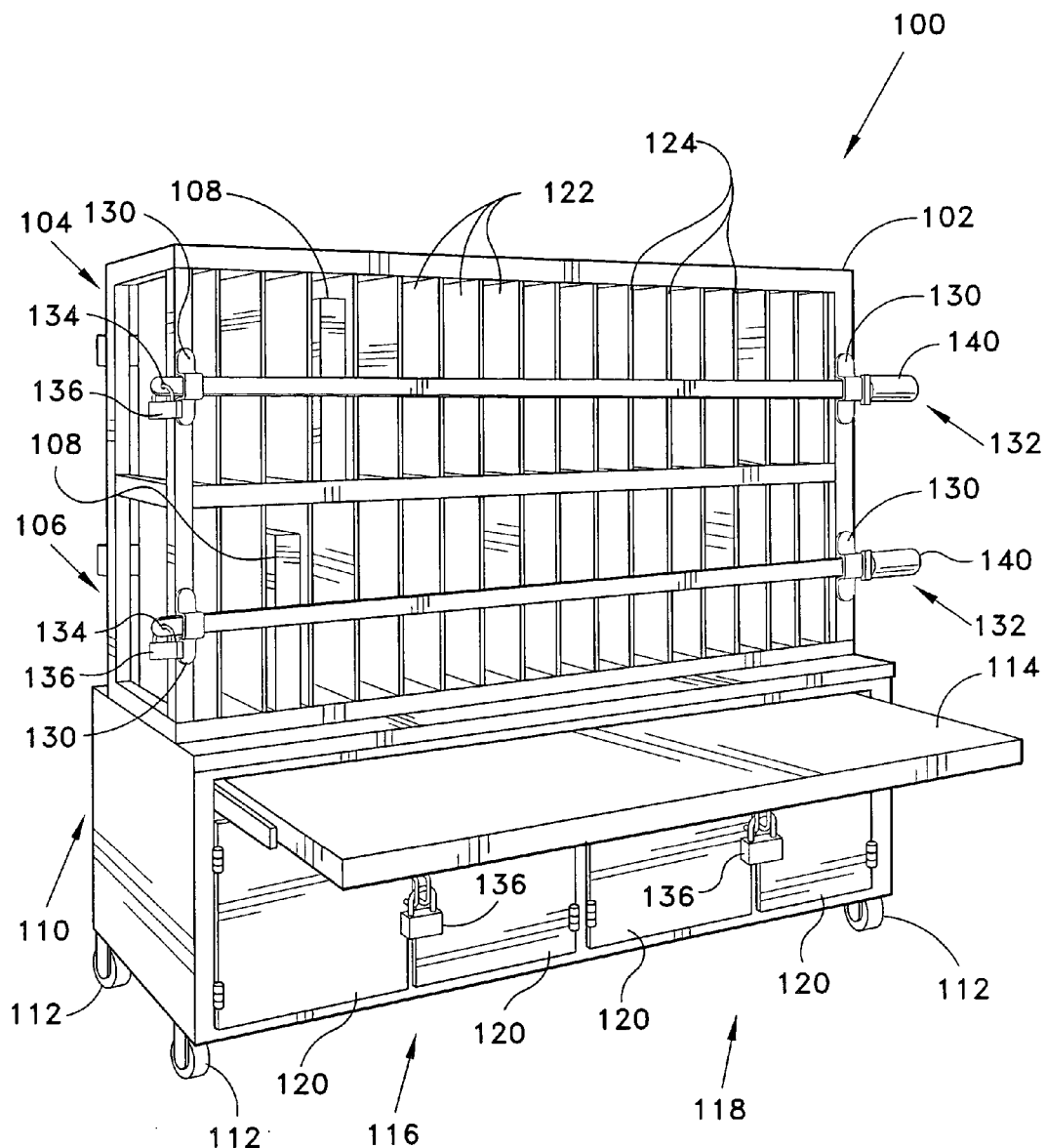
FIG. 1 is an environmental, perspective view of a mobile storage system for housing a plurality of electronic election devices according to the present invention.

FIG. 1 illustrates the mobile storage system 100 of the present invention. The storage system 100 has an upper rectangular framework 102 mounted to a rectangular base unit 110. The base unit 110 has an extendable work surface 114 and additional storage compartments 116, 118. The base unit 110 and the upper framework 102 are formed from welded aluminum members; the upper framework 102 and base unit 110 are then welded together and covered with ¼" inch plastic sheeting.

Figure 2:
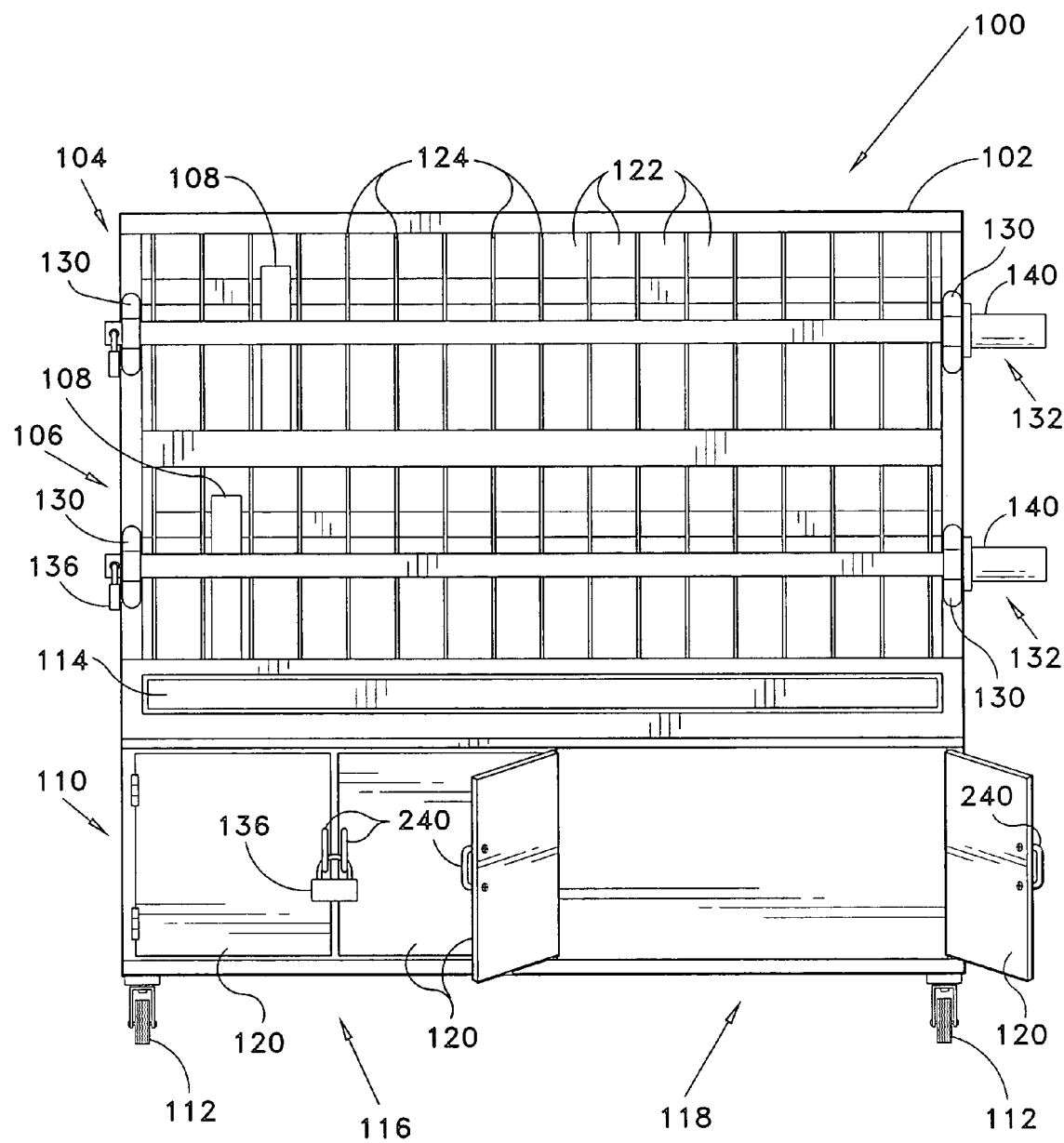
FIG. 2 is a front view of a mobile storage system according to the present invention.
Figure 3:
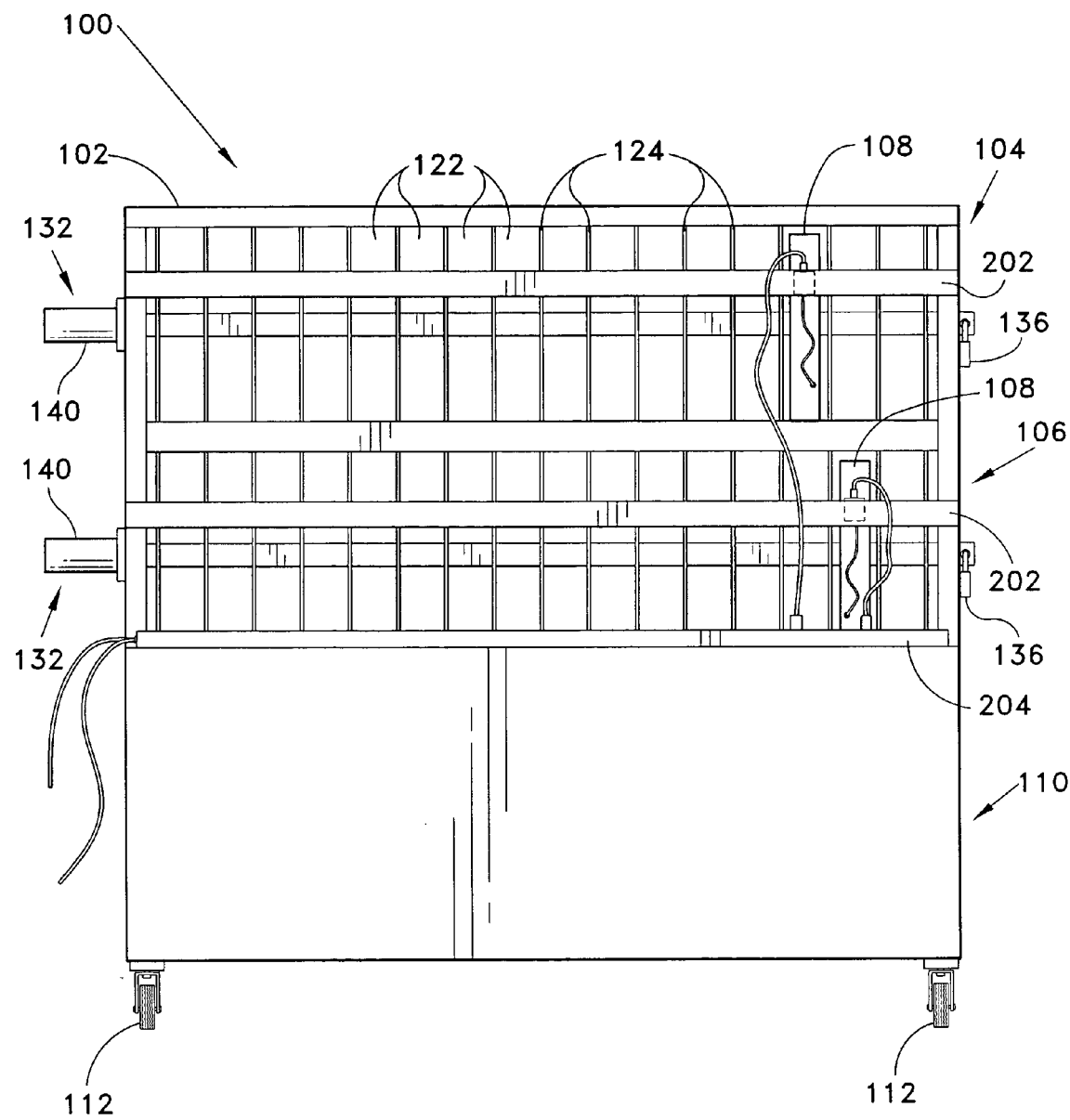
FIG. 3 is a rear view of a mobile storage system according to the present invention.

As best seen in FIGS. 1–3, the upper framework 102 is approximately seventy-six inches long and has two rows 104, 106 having a number of slotted compartments 122, each row is dimensioned to receive sixteen portable election devices 108. Although the present embodiment is designed to store thirty-two election devices, the mobile storage system 100 may be easily sized to a user's specific requirement. The rows 104, 106 are framed with aluminum members and the compartment dividers 124 are made of ¼ inch plastic sheeting or other suitable material. A lockable and removable steel retaining bar 132, mounted in front of each row 104, 106, prevents unauthorized removal of the election devices 108. Each retaining bar 132 has a handle 140 on one end and an aperture 134 on the other end through which a user supplied padlock 136 secures the retaining bar 132 within mounting hardware 130 welded to the framework 102.

The base unit 110 is a rectangular enclosure approximately seventy-six inches long, thirty inches deep and thirty inches tall and has four four-inch casters 112 mounted on the lower corners, allowing the storage system 100 to be easily moved when loaded with a full complement of portable election devices 108. A work surface 114 made of ½ inch plastic sheeting or other suitable material is slidably received within the front of the base unit 110. Two storage compartment 116, 118 disposed beneath the sliding work surface 114 provide additional storage area and are accessible through hinged front panels 120 made of ½ inch plastic material. The storage compartments 116, 118 may be secured by means of a padlock 136 passing through door handles 240 or any equivalent locking mechanism.

Figure 4:
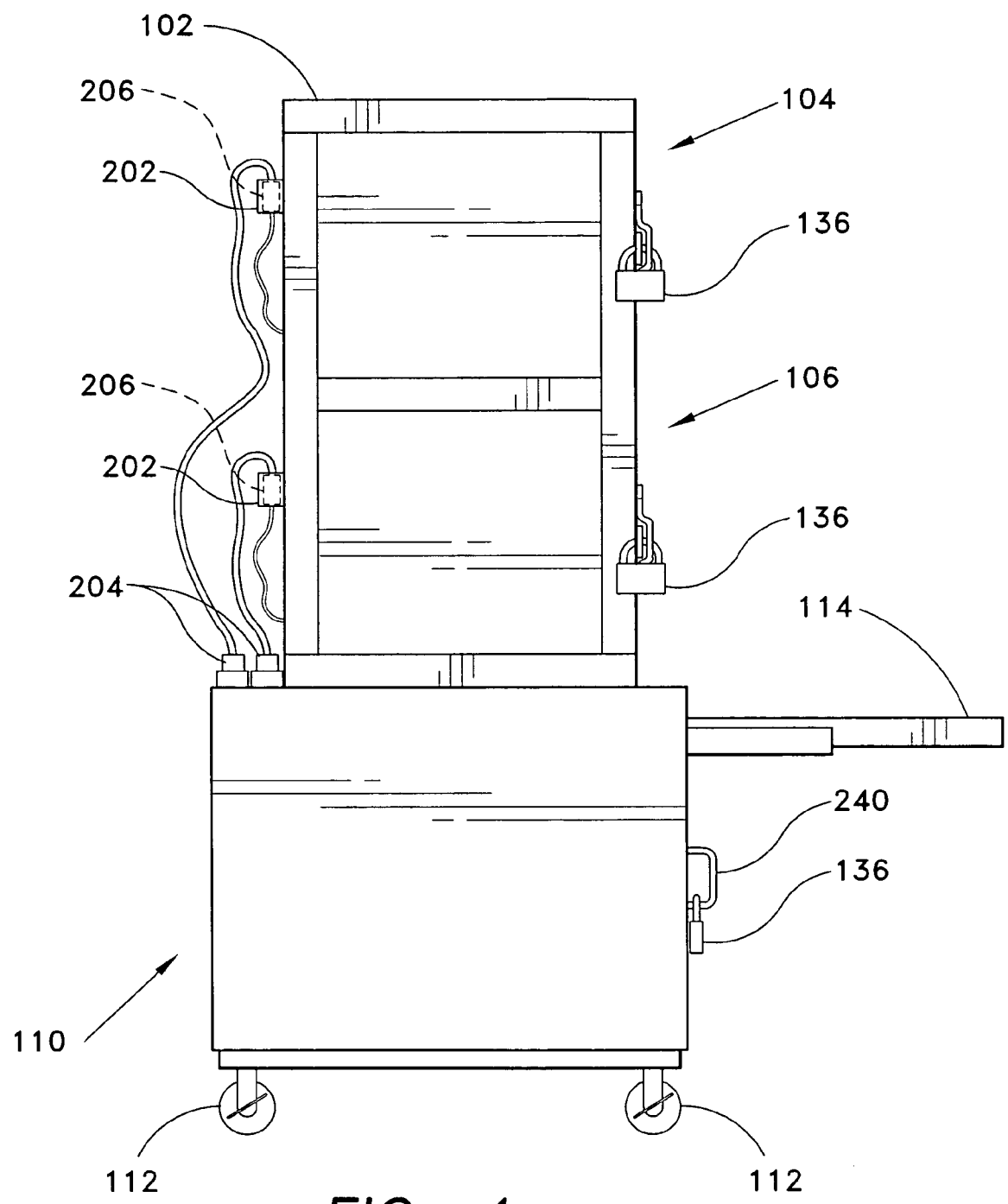
FIG. 4 is a side view of a mobile storage system according to the present invention.
Figure 5:
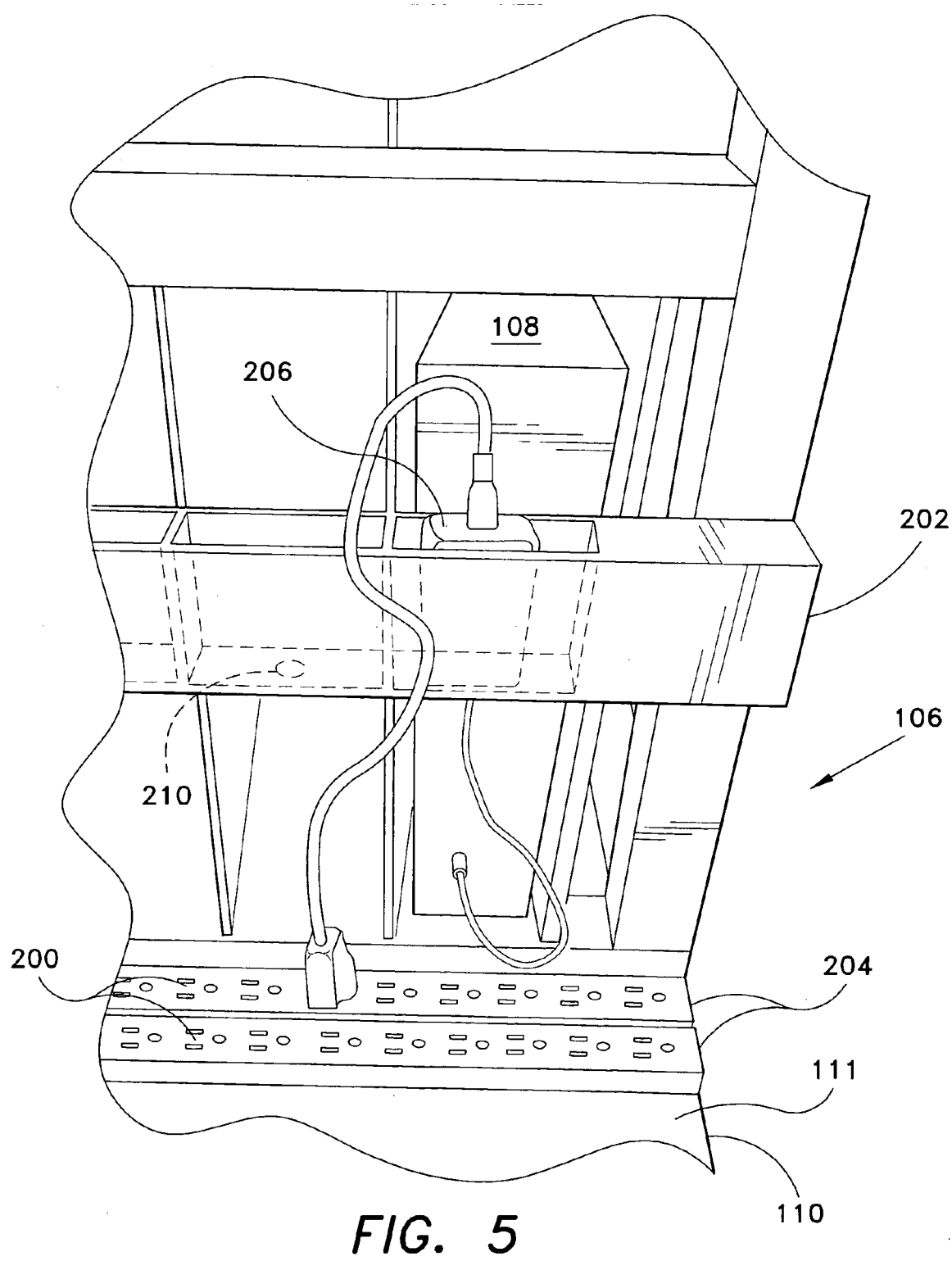
FIG. 5 is a fragmented view of the rear of a mobile storage system according to the present invention detailing the battery charger support member.

Referring now to the rear of the mobile storage system 100 shown in FIG. 3, a horizontal aluminum member 202 is welded across the rear of each row 104, 106 of slotted compartments 122. As best illustrated by FIGS. 4 and 5, aluminum member 202 serves two purposes. The first purpose is to prevent the removal of the election devices 108 from the rear of the slotted compartment 108, and the second purpose is to support a bank of battery chargers 206 associated with each election device 108. The battery charger's AC power cord is inserted into an AC power receptacle 200 of a power strip 204 mounted to the top surface 111 of the base unit 110. The output DC power cord of each battery charger 206 passes through an aperture 210 cut in the bottom of the horizontal aluminum member 202 beneath the battery charger 206.

It is to be understood that the present invention is not limited to the sole embodiment described above, but encompasses any and all embodiments within the scope of the following claims.

I claim:

1. A mobile storage system for housing a plurality of electronic devices, comprising:
    a wheeled base unit having a top surface, a bottom surface, a front and rear, and two ends, a sliding work surface received by the front of said base unit and at least one lockable storage compartment located beneath said sliding work surface;
    an upper cabinet mounted on said base unit, the upper cabinet having a front and a rear, and having a plurality of slotted compartments arranged in at least one row, each of the slotted compartments being open at both the front and the rear of the upper cabinet;
    a horizontal member mounted across the rear of each of said at least one row of slotted compartments, said horizontal member having a plurality of horizontally spaced, top accessed compartments defined therein;
    a retaining bar removably mounted across the front of said plurality of slotted compartments; and
    an AC power strip having a plurality of AC power receptacles mounted to the top surface of said base unit, said AC power strip being located adjacent the rear of said upper cabinet.

2. The mobile storage system according to claim 1, wherein said slotted compartments are accessible from the front of said cabinet.

3. The mobile storage system according to claim 1, wherein each slotted compartment is dimensioned for receiving a portable electronic election device.

4. The mobile storage system according to claim 1, wherein said base unit and said upper cabinet are formed of welded aluminum members covered with plastic sheeting.

5. The mobile storage system according to claim 1, wherein said AC power strip mounted to the top surface of said base unit extends substantially the entire distance between the two ends of said base unit.

6. A mobile storage system for housing a plurality of electronic election devices, comprising:
    a wheeled base unit having a top surface, a bottom surface, a front and a rear, and two ends, said base unit having a sliding work surface received by said front side;
    an upper cabinet mounted on said base unit, the cabinet having a front and a rear, and having a plurality of front accessed slotted compartments arranged in at least one row, each of the slotted compartments being open at both the front and the rear of the upper cabinet;
    a retaining bar removably mounted across the front of said plurality of slotted compartments;
    an AC power strip mounted to the top surface of said base unit and adjacent the rear of said upper cabinet, said AC power strip having a plurality of AC power receptacles: and
    at least one lockable storage compartment beneath said sliding work surface;
    whereby a portable electronic election device may be accommodated in each of said plurality of slotted compartments.

7. The mobile storage system according to claim 6, wherein said base unit and said upper cabinet are formed of welded aluminum members covered with plastic sheeting.

8. The mobile storage system according to claim 6, further comprising a horizontal member fixedly mounted across the rear of each of said at least one row of slotted compartments, said horizontal member having a plurality of horizontally spaced, top accessed compartments defined therein.

9. The mobile storage system according to claim 6, wherein said AC power strip mounted to the top surface of said base unit extends substantially the entire distance between the two ends of said base unit.

* * * * *